C. J. CARLSON.
TIRE.
APPLICATION FILED SEPT. 9, 1920.
1,409,151.
Patented Mar. 14, 1922.
3 SHEETS—SHEET 1.
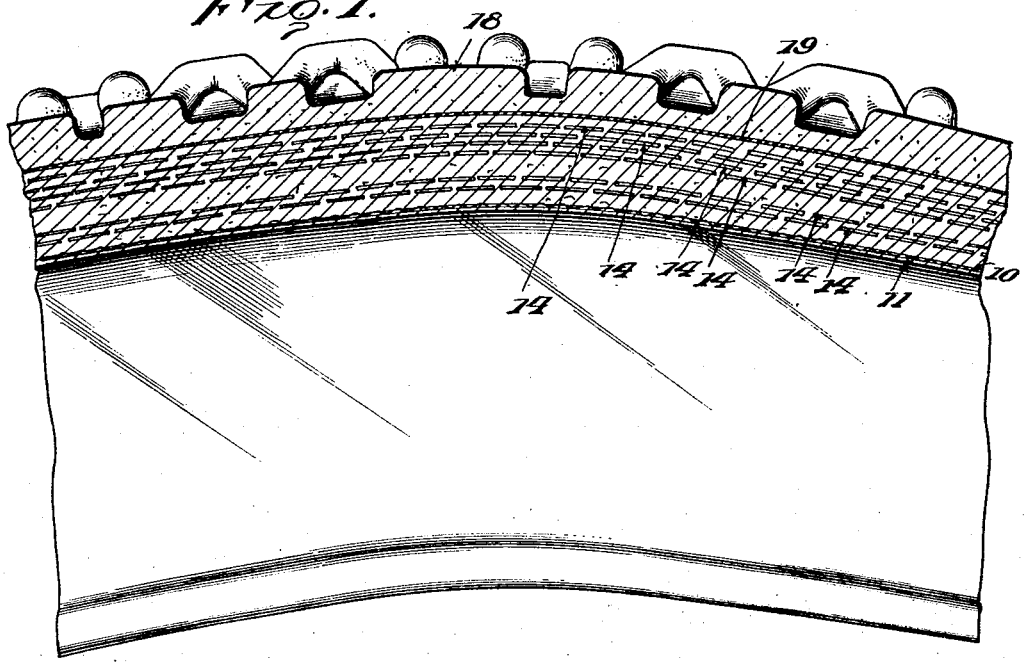
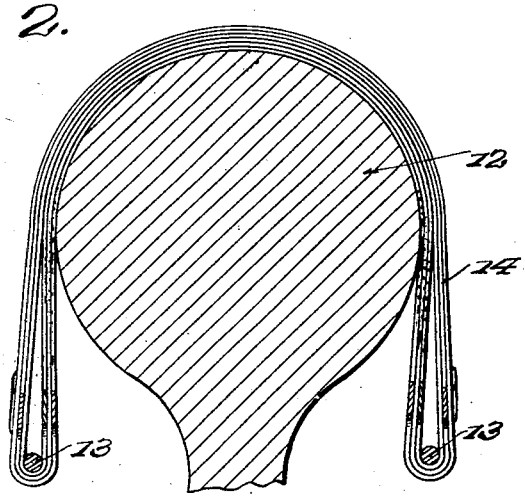
C. J. Carlson, INVENTOR.
BY
Lacey & Lacey, ATTORNEYS.

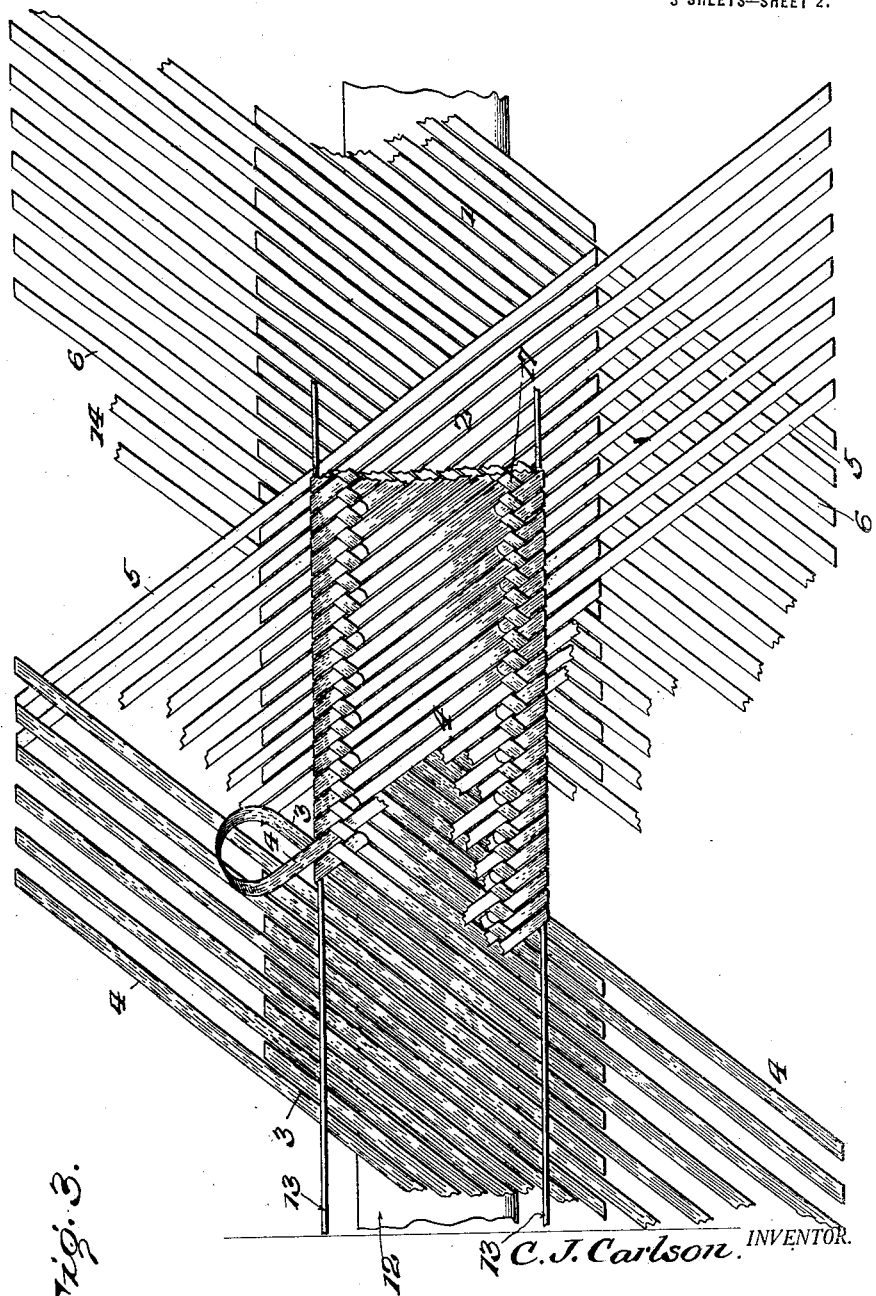

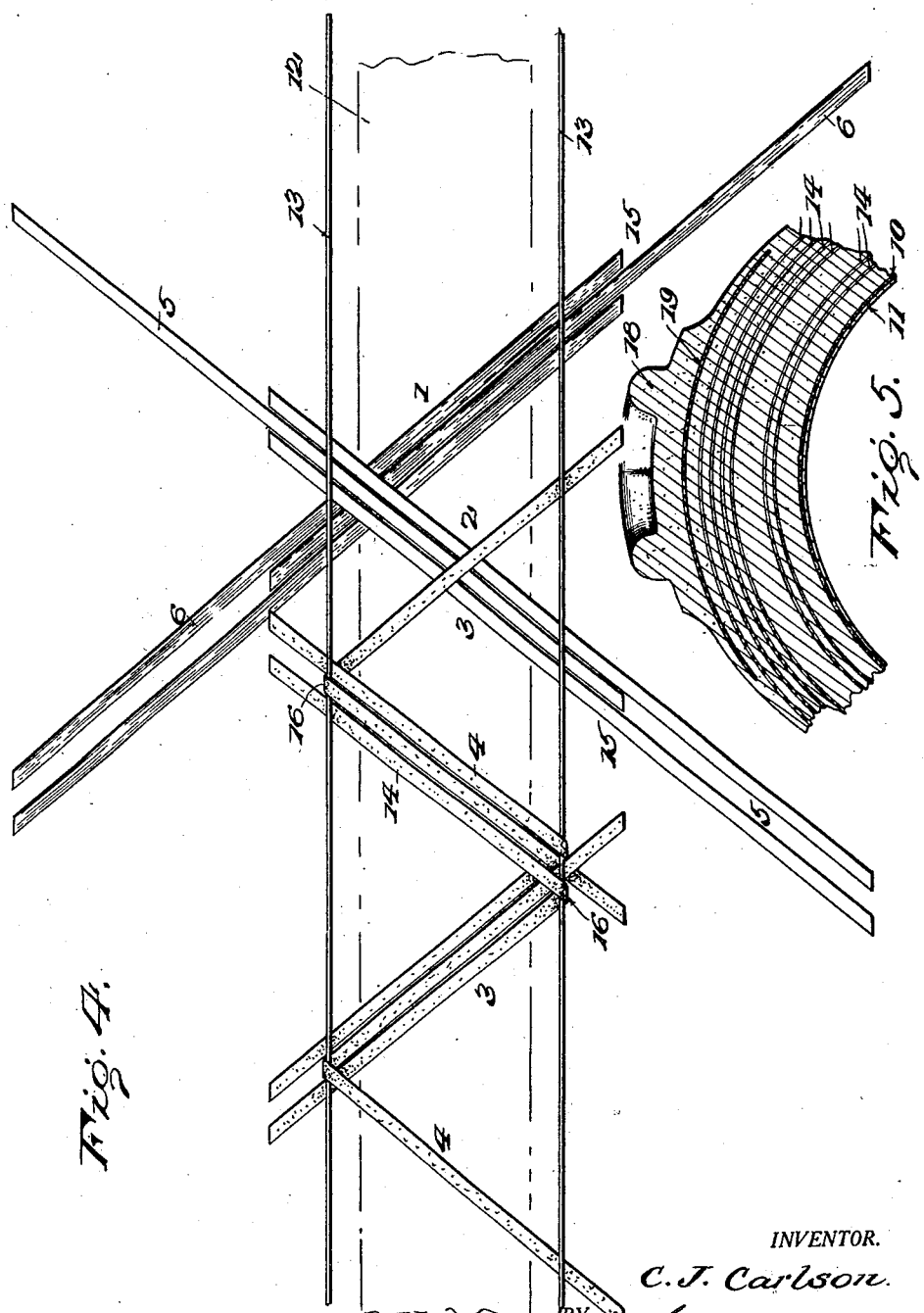

UNITED STATES PATENT OFFICE.

CHARLES J. CARLSON, OF HELENA, MONTANA.

TIRE.

1,409,151.      Specification of Letters Patent.      Patented Mar. 14, 1922.

Application filed September 9, 1920. Serial No. 409,221.

*To all whom it may concern:*

Be it known that I, CHARLES J. CARLSON, a citizen of the United States, residing at Helena, in the county of Lewis and Clark and State of Montana, have invented certain new and useful Improvements in Tires, of which the following is a specification.

This invention relates to pneumatic tires and has especial reference to tire shoes or casings known as the "cord" type as distinguished from shoes built up of a plurality of plies of fabric sheets.

The invention has for its object the production, in a novel manner, of a tire in which the deteriorating friction caused by the working of separate strands of cords or plies will be practically eliminated, and in which the several strands will be so disposed relative to each other as to thoroughly reinforce the entire body of the shoe and minimize the liability to blow-outs and rim-cuts.

The invention also has for its object the provision of a tire in which the reinforcing strands will be readily and thoroughly impregnated with the rubber so that separation of the strands from the rubber will be prevented, disintegration of the tire or shoe being thereby avoided and the life of the same prolonged. With these and other objects in view, the invention consists in the novel construction and method of producing the same hereinafter set forth.

In the drawings:

Figure 1 is a longitudinal section of a portion of a tire constructed in accordance with my invention;

Figure 2 is a transverse section of a mandrel with some of the reinforcing and supporting strands in position thereon;

Figure 3 is a plan view showing diagrammatically the method of laying in the several strands and of weaving in the ends of the cords;

Figure 4 is a similar view showing only a few strands in order to more clearly disclose the relation of the several series of strands;

Figure 5 is a detail transverse section of a portion of the shoe or tire.

In forming the tire, a fabric lining 10 may be employed and may be given a coating 11 of rubber so that a smooth surface will be presented at the inner face of the tire or shoe although these members are not essential elements of my invention. When these members are employed, they will be brought into proper form upon a mandrel in a well-known manner.

In the practice of the invention, a mandrel 12 is employed and rings 13 are supported parallel with the sides of the same and spaced therefrom. The rings 13 constitute the bases for the rim-engaging beads of the tire or shoe and are illustrated as consisting each of a single wire of circular cross-section but it is to be understood that they may be composed of a plurality of wires arranged in compact form side by side and given any desired cross-sectional configuration. Across the mandrel, or across the lining formed thereon when the lining is employed, I place a plurality of strands of flat braid or tape 14, the strands being disposed diagonally or obliquely to the plane of the mandrel and to the bead rings 13 and arranged in several superposed series. In Figures 3 and 4, three series of strands are shown and designated, respectively, 1, 2 and 3. The strands are all the same length and are to pass twice across the mandrel but, as indicated at 15, the strands of each series are arranged in staggered relation so that each strand will present a short end beyond one ring 13 and a long end beyond the other ring 13, the short ends and long ends alternating. The strands are placed across the mandrel with their edges as close as possible and their ends passing between the mandrel and the bead rings. After the series 1 has been placed upon the mandrel, the series 2 is laid over the series 1 in intersecting relation thereto, the angle of intersection being approximately a right angle. The series 3 is then laid over the series 2 and across the mandrel in approximately the same diagonal planes as the series 1, the strands of the several series, between the bead rings, furnishing three layers of reinforcement or carcass. I now take the long ends of the series 3 and bend them successively around the adjacent bead ring 13, as at 16, and across the mandrel and under the remote bead ring, the bending of each strand causing the branches thereof to lie at approximately a right angle. I thus provide a reinforcing and supporting layer, designated 4 in Figures 3 and 4, the members of which extend across the members of the series or layer 3. The long ends of the strands of the series 2 are then in like manner folded over the layer 4 to produce a layer designated 5, after which the long ends of the series 1 are folded over the series 5 to form the outer layer, designated 6. All the hanging ends of all the strands are then bent back around the adjacent bead ring and interlaced with the strands immediately above the ring, as at 17, the projecting stubs being subsequently trimmed evenly. After the strands have been set across the mandrel as described, a caoutchouc filler is applied to create an elastic bond between all the strands. This filler may be applied in any well-known manner, provided it is caused to penetrate all the layers so as to thoroughly impregnate the same. A homogeneous carcass of fabric strands and rubber is thus produced which may be placed in association with an elastic tread portion of any desired design, the drawing showing a raised non-skid tread 18 with the usual breaker strip 19. The carcass having been enclosed in the tread, the complete shoe or casing is vulcanized or cured in the customary manner.

It will be readily understood that the method of constructing a tire or shoe herein set forth produces a smooth carcass in which the reinforcing strands will be saturated with and completely embedded in the rubber and the finished article will have all the elasticity and easy-riding qualities of a "cord" tire with the strength and durability of a "fabric" tire. The several layers of the reinforcement may be more or less close together accordingly as the several strands are drawn more or less tightly after bending or while being interlaced, but no two adjacent layers will run in the same direction so that the tread portion of the tire will be reinforced throughout its entire extent and the presence of weak spots due to separation of the cords is obviated. In Figure 1, the several members of the reinforcement appear to be widely separated but this showing is an exaggeration to permit the construction to be more readily understood.

When the tire is vulcanized and cured in the usual manner, the cord strands of the different plies will be effectively secured to the cores of the beads while the layers of rubber between the cord plies will act to firmly cement and secure the plies in position as well as also secure the strands of each ply against relative movement, the vulcanizing and curing process forming the whole into an integral structure. The interlacing of the ends of the strands imparts great strength to the sides of the tire so that it will resist bulging strain as well as longitudinal or circumferential stress, and a tire of given diameter will, when inflated, be of a maximum circumference. As is well known, the bulging stress upon a tire is much greater than the circumferential stress, tires as commonly constructed failing in that they are not sufficiently reinforced against bulging stress. However, while the cord plies are designed to perform the primary function of reinforcing the tire against bulging stress, it is to be observed that by employing flat ribbons or strands for forming the cord plies, the strands of each ply will resist separation. Consequently the plies will also serve to reinforce the tire against circumferential stress. I accordingly provide a highly effective tire construction. In forming the tires of relatively large diameter, the number of cord plies employed may, of course, be proportionately increased and similarly in forming tires of small diameter, the number of cord plies used may be proportionately decreased.

Having thus described the invention, what is claimed as new is:

1. A tire casing including superposed plies of flat braids, the adjacent portions of the plies lying transversely with respect to each other and the ends of the braids in all the plies being interlaced with the intersecting portions of adjacent braids.

2. A tire casing including a plurality of flat braids in superposed intersecting relation, the ends of the braids being folded upon themselves and having their overlying portions interlaced with the adjacent lengths of intersecting braids, and a vulcanizable filler impregnating and embedding the superposed braids.

3. A tire casing including a pair of beads, and a plurality of superposed plies of flat braids, the braids being arranged diagonally and passed under the beads from the inner sides thereof and then upwardly over the outer sides thereof, the ends of the several braids being interlaced over and under the adjacent portions of intersecting braids at the beads.

4. A tire casing including a pair of beads and a plurality of superposed plies of diagonal flat braids with the braids in one ply arranged across the braids of a superposed ply, the braids of each ply having their ends arranged alternately adjacent the opposite beads and each braid being folded at its middle over the adjacent bead and having its ends passing under and then over the respectively adjacent bead, the ends of all the braids being interlaced with adjacent portions of intersecting braids.

5. A tire casing including a pair of beads and a plurality of superposed plies of diagonal flat braids, each braid being arranged with both its ends adjacent the same bead and its middle doubled around the opposite bead and the alternate braids in each ply having their ends adjacent opposite beads, the ends of all the braids being carried over the adjacent beads and interlaced with adjacent portions of intersecting braids.

In testimony whereof I affix my signature.

CHARLES J. CARLSON. [L. S.]